US005511692A

United States Patent [19]

Willingham

[11] Patent Number: 5,511,692

[45] Date of Patent: Apr. 30, 1996

[54] FLUID DISPENSE SYSTEM

[75] Inventor: John D. Willingham, Hull, United Kingdom

[73] Assignee: Royal Packaging Industries Van Leer B.V., Amstelveen, Netherlands

[21] Appl. No.: 211,827

[22] PCT Filed: Oct. 16, 1992

[86] PCT No.: PCT/GB92/01893

§ 371 Date: Jun. 6, 1994

§ 102(e) Date: Jun. 6, 1994

[87] PCT Pub. No.: WO93/08118

PCT Pub. Date: Apr. 29, 1993

[30] Foreign Application Priority Data

| | | | |
|---|---|---|---|
| Oct. 18, 1991 | [GB] | United Kingdom | 9122256 |
| Mar. 31, 1992 | [GB] | United Kingdom | 9207067 |
| Jun. 18, 1992 | [GB] | United Kingdom | 9212972 |

[51] Int. Cl.[6] .......... F16L 39/00

[52] U.S. Cl. .......... 222/1; 137/614.04; 141/346; 141/348; 141/351; 222/400.7

[58] Field of Search .......... 222/1, 518, 400.7, 222/484; 137/614.04; 141/346, 348, 349, 351–355

[56] References Cited

U.S. PATENT DOCUMENTS

| | | | |
|---|---|---|---|
| 3,142,416 | 7/1964 | Federighi | 137/614.04 X |
| 3,596,810 | 8/1971 | Taubenheim | 222/400.7 |
| 3,939,860 | 2/1976 | Golding | 222/400.7 X |
| 4,180,189 | 12/1979 | Zurit et al. | 222/400.7 |
| 4,351,456 | 9/1982 | Nezwobki | 222/400.7 |
| 4,450,853 | 5/1984 | Dessenoix et al. | 222/400.7 X |
| 4,483,368 | 11/1984 | Panthöfer | 137/614.04 |
| 4,510,969 | 4/1985 | Rodth | 137/614.04 X |
| 4,564,132 | 1/1986 | Lloyd-Davies | 137/614.04 X |
| 4,759,475 | 11/1988 | Munthe | 222/518 X |
| 4,948,014 | 8/1990 | Rutter et al. | 137/614.04 X |
| 5,392,844 | 2/1995 | Lomax et al. | 137/614.04 X |

FOREIGN PATENT DOCUMENTS

| | | |
|---|---|---|
| 0487844 | 6/1991 | European Pat. Off. . |
| 2013569 | 10/1970 | Germany . |
| 2326081 | 6/1974 | Germany . |
| 2185469 | 7/1987 | United Kingdom . |
| WO88/06693 | 9/1988 | WIPO . |

*Primary Examiner*—Kevin P. Shaver
*Attorney, Agent, or Firm*—William R. Hinds

[57] ABSTRACT

Disclosed herein is a method of and apparatus for negative pressure dispensing of fluids wherein a dispense valve assembly (12) seals a container (18) and has valves (26) for ingress of ambient air and (38) for egress of dispensed fluid respectively, and a coupling head (58) mates with the dispense valve assembly and has a mechanism (62, 74, 84) operative to open the air and fluid valves and form a sealed connection (52, 84) solely with the fluid valve, such that fluid can be pumped out of the container via the fluid valve and the coupling head, whilst ambient air flows into the container via the air valve. In a preferred embodiment, the engagement (24, 66, 70) between the coupling head body (64) and the dispense valve body (20) is arranged to provide an unsealed airflow path between the coupling head (58) and the dispense valve assembly (12); a one-way valve (96, 98) is fitted in the airflow path within the dispense valve assembly (12), to prevent fluid from leaking out of the container through the air valve (26) when the coupling head (58) is mated to the dispense valve assembly; and the coupling head (58) and the dispense valve assembly (12) are mainly comprised of moulded plastics component.

20 Claims, 3 Drawing Sheets

FLUID DISPENSE SYSTEM

This invention relates to a method of dispensing fluids from containers and to a fluid coupling therefor.

There is a class of fluid dispense systems employing negative pressure dispensation of fluids-from containers, such as expensive or hazardous liquid chemicals, the container being fitted with a dispense valve assembly that is to be mated with a coupling at a point of use to enable the fluid to be pumped from the container; for example, as described in International Patent Specification No. WO 88/06693 (The Mogul Corporation).

There is also a class of fluid dispense systems employing positive pressure dispensation of fluids from containers, such as gas pressure dispensing of beer from kegs. Known keg beer dispense systems comprise a dispense valve assembly having a valve member spring-loaded to normally close an annular outlet port in the top of a valve body, that is fitted into the neck of a beer keg. A coupling head has a body to engage the top of the dispense valve body and an internal reciprocating member movable downwardly of the coupling head to seal with and force down the dispense valve body member and thereby open the valve and define a central outlet and a concentric inlet for the dispense valve assembly. The coupling head also has a beer outlet line connected to the central outlet, via the slideable member, and an inlet for pressurised gas to connect with the concentric port, via a gas passage between the coupling head body and the slideable member. The dispense valve assembly has to seal both the gas inlet annulus and the beer outlet port when the coupling head is disconnected from the keg dispense valve assembly and the coupling head has to seal the pressure gas inlet when it is disconnected from keg dispense valve assembly.

It is an object of the present invention to provide a negative pressure dispense system and couplings that are as simple and safe to use as those for a gas pressure beer dispense system, but which prevent leakage of dispensed fluid wherever possible.

According to the present invention, a method of dispensing fluid from a sealed container by negative pressure comprises the steps of:

mating a coupling head to the dispense valve assembly of a container, the dispense valve assembly sealing the container and having valves, for ingress of ambient air and egress of dispensed fluid respectively, and the coupling head being arranged to open the air and fluid valves and form a sealed connection solely with the fluid valve;

connecting the coupling head to a suction pump;

pumping fluid out of the container via the fluid valve and the coupling head, whilst ambient air flows into the container via the air valve; and, upon completion of dispensation of fluid, removing the coupling head from the dispense valve assembly;

whereupon the air and fluid valves will close, to reseal the container.

Also according to the present invention a fluid coupling for a negative pressure fluid dispense system comprises:

a dispense valve assembly for sealing a container and having valves, for ingress of ambient air and egress of dispensed fluid respectively; and, a coupling head to mate with the dispense valve assembly and arranged to open the air and fluid valves and form a sealed connection solely with the fluid valve;

whereby fluid can be pumped out of the container via the fluid valve and the coupling head, whilst ambient air flows into the container via the air valve.

In an embodiment of the present invention, the dispense valve assembly is arranged to be fitted into the neck of a fluid container, the dispense valve assembly has a valve member spring-loaded to normally close an annular outlet port in the top of a dispense valve body and the coupling head has a body to releasably engage the top of the dispense valve body and a ducted member axially slideable within the coupling head body for the bottom end of the slideable member to engage and force down the dispense valve member, to define and seal a central fluid outlet and form a concentric air inlet for the dispense valve assembly. Thus the ease of use of a gas pressure beer dispense system is retained, the coupling head only has to be engaged with the dispense valve assembly and the slideable member moved downwards to broach the container and enable fluid to be pumped out without leakage.

The principal difference between the present invention and the above-described gas pressure beer dispense system is that the coupling does not have to provide for pressurised gas. An air vent in the coupling head does not have to be sealed from ambient in any way. The only sealing that has to be provided is for dispensed fluid. This much simplifies the construction and cost of the coupling head.

The present invention also differs from the aforementioned Mogul coupling which does not have a dispense valve assembly, relying on a screw cap 60 for container sealing.

According to a further embodiment of the present invention, the engagement between the coupling head body and the dispense valve body is arranged to provide an unsealed air flow path between the coupling head and the dispense valve assembly.

According to another embodiment of the present invention, a one-way valve is fitted in the air flow path within the dispense valve assembly, to prevent fluid from leaking out of the container when the coupling head is mated to the dispense valve assembly. By this means, escape of fluid along the input air flow path is prevented should the broached container be overturned. The dispense valve assembly completely seals the container whenever a coupling head is not coupled.

According to a still further embodiment of the present invention, the dispense valve assembly has a spear descending from the dispense valve body to the bottom of the container and the bottom end of the spear is provided with an axially slideable sleeve to contact the container bottom. By this means, almost the entire contents of the container can be dispensed and this is very significant for expensive chemicals. Preferably, the lower end of the spear sleeve is notched or otherwise shaped to provide for passage of fluid into the spear between the lower end of the sleeve and the container bottom. Advantageously, the bottom of the container is provided with a sump in the region of the spear sleeve to further assist complete dispensation of fluid.

In a preferred embodiment of the present invention, the coupling head and dispense valve assembly are mainly comprised of moulded plastics components. The pressures to which negative pressure dispense systems are exposed are significantly lower than for positive pressure dispense systems and thus lower strength materials can be employed; with considerable cost savings. Cost saving is not simply for commercial gain. The most common means for dispensing liquid chemicals is simply by removing a bung from a drum of chemicals and introducing a pipe attached to a pump. This is clearly hazardous. However, to successfully compete with this common practise, couplings in accordance with the present invention will have to be relatively inexpensive otherwise they will not be used in spite of their safety benefits.

At first sight, the obvious and cheapest source for negative pressure dispense system couplings would be to use modified positive pressure beer dispense systems; such as the "Target 2000 Closed Returnable System" marketed by Micromatic A/S of Denmark. However, by careful analysis of the usage requirements of negative pressure dispensation, especially of hazardous chemicals, the applicants have discovered that the most cost effective route is to develop purpose-designed couplings whose principal of operation is adapted from positive pressure dispense couplings. The Micromatic system retains an air inlet port in the coupler, with seals between the slideable ducted member and the coupler body, both above and below the air inlet port, and a seal between the coupler body and the dispense valve flange; all to ensure that air can only flow into the container via the coupler air inlet port. The coupler according to the present invention does not require a coupling head air inlet port to be sealed or even an air inlet port in the coupling head.

The above and other features of the present invention are illustrated, by way of example, by the Drawings, wherein.

Figure 1:
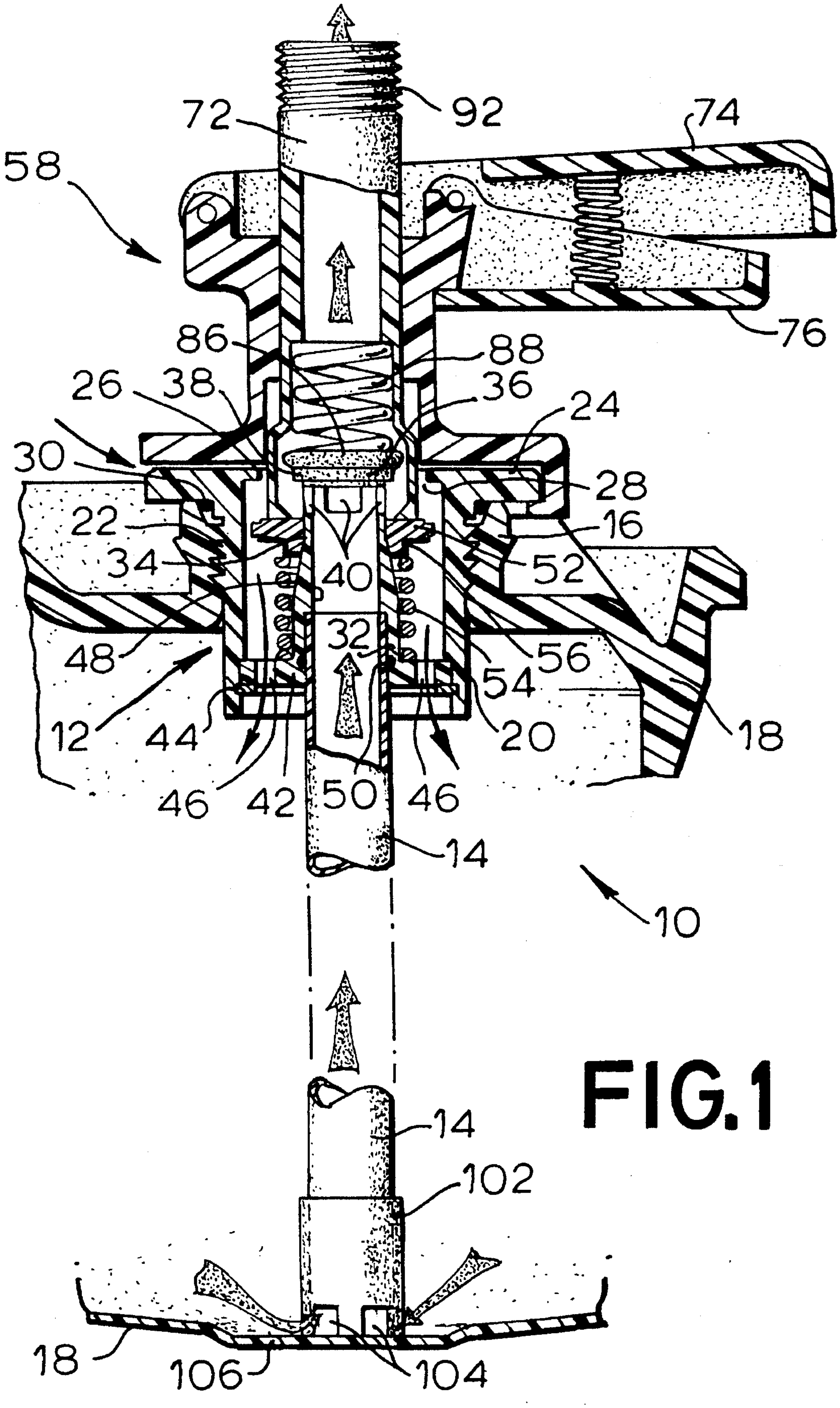
FIG. 1 is a part sectioned elevation of a coupling head coupled to a drum lance in accordance with the present invention and broaching a drum lance.
Figure 2:
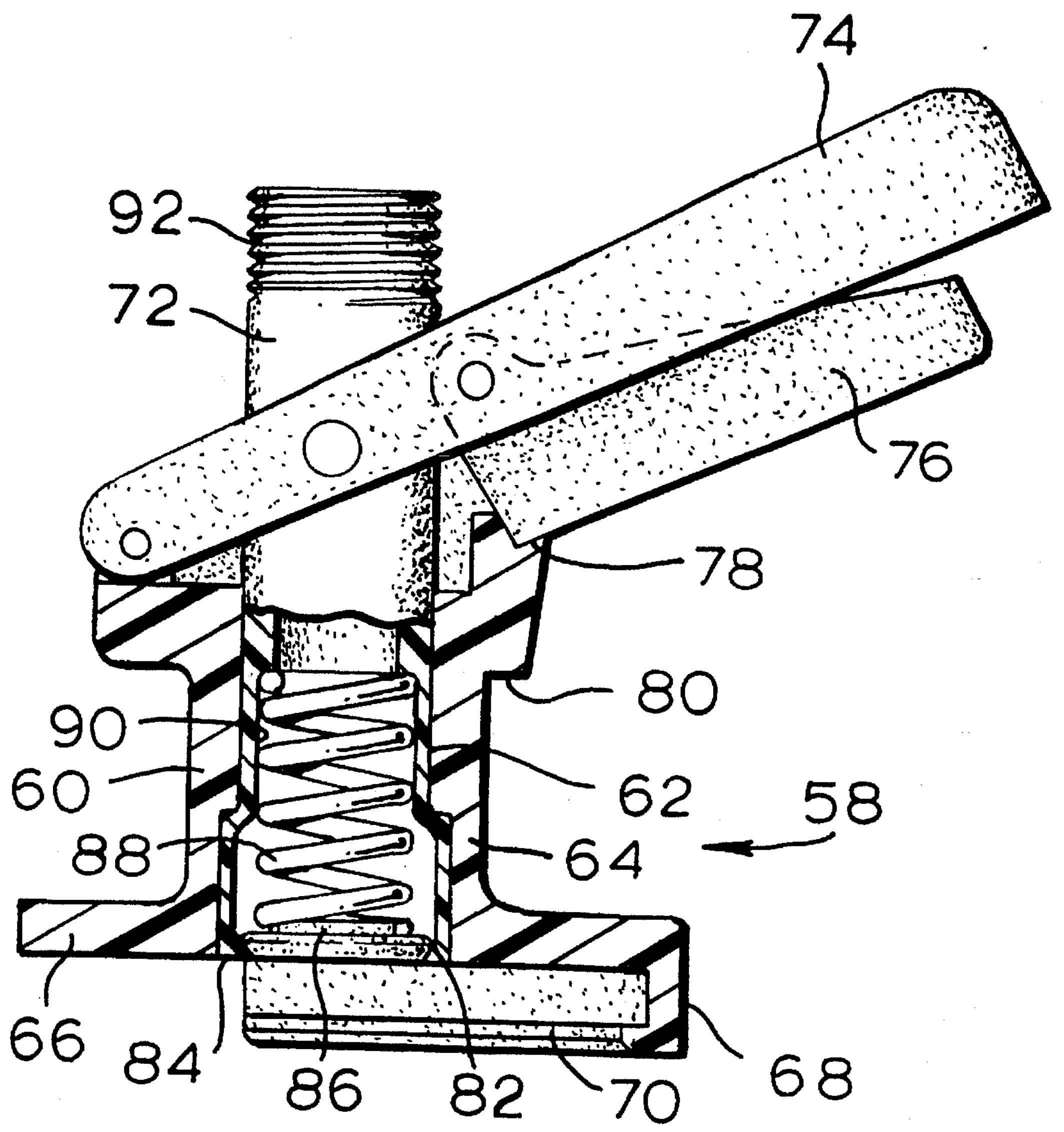
FIG. 2 is a similar view of the coupling head of FIG. 1, but when uncoupled.

As shown by FIGS. 1 and 2, a lance 10, consisting of a dispense valve 12 and a descending spear 14, is screwed into the neck 16 of a drum 18.

The dispense valve assembly 12 comprises a generally cylindrical body 20, formed of high density polyethylene, having an external thread 22 to mate with the threaded drum neck 16. The top of the dispense valve body 20 has a radially outwardly extending, integral flange 24 which has an inner circular rim 26 defining the outer peripheral valve seat of an annular valve port 28. A sealing ring 30 is trapped under the valve flange 24 and against the mouth of the drum neck 16. The shape of the outer rim of the valve flange depends upon the coupling head to which the dispense valve-assembly is to be coupled; in this example the rim is circular, but it could be tri-lobal, hexagonal etc. The shape of the flange may be keyed to the chemical to be dispensed; thus providing against dispensing the wrong chemical as each shape of flange can only couple to the complimentary coupling head.

A core 32, also formed of high density polyethylene, is fitted within the dispense valve body, the core has a central, hollow pillar 34 closed at the top by an integral cap 36 that is coplanar with the valve flange 24. The outer, circular rim 38 of the cap defines the inner peripheral seat of annular valve port 28. Ports 40 are provided in the side walls of the core pillar 34, which side walls flare radially outwardly beneath the core pillar ports. The bottom of the core pillar has a radially outwardly extending, annular integral flange 42 with a circular outer periphery that fits within the dispense valve body 20 and is retained therein by a circlip 44. The core flange 42 has a series of axial ports 46 and a central bore 48 into the bottom of which the spear 14 is push fitted, the spear being formed by a tube of polyvinylchloride that descends to the bottom of the drum 18. An O-ring 50 in the central pillar bore 48 seals and helps to retain the spear in the pillar.

A ring poppet valve 52, formed of Ethylene Propylene Diamene Monomer (EPDM), is located about the core pillar under the cap 36 and is loaded thereagainst by a stainless steel coil spring 55, that encircles the core and is trapped between the core flange 42 and a stainless steel seating plate 56 supporting the popper valve. The poppet valve 52 therefore normally closes the annular valve port 28, sealing against the outer valve seat 26 and the inner valve seat 38; the seating plate 56 prevents the popper valve from being forced through the valve port. Poppet valve 52 also seals core pillar ports 40, when the valve is closed.

A coupling head 58 has a generally cylindrical body 60, formed of high density polyethylene, with a central bore 62 which has a bottom portion 64 of wider diameter than the top portion. The bottom of the coupling head valve body 60 has a radially outwardly extending, integral flange 66 with, in the example, a circular outer rim. A diametral half of the rim has a depending axial extension 68 with an inturned lip 70, such that the coupling head flange 66 can be slide sideways over the dispense valve flange 24 until the coupling head axial extension abuts part of the rim of the dispense valve flange and the coupling head lip 70 engages under the dispense valve flange rim.

The coupling head has a central tubular member 72, also formed of high density polyethylene, the lower portion of the tubular member is of larger diameter than the upper portion and is a sliding fit within the coupling head body. The tubular member 72 is operated by a handle 74 pivoted to the coupling head body and slidingly engaging the tubular member 72 after it emerges from the top of the coupling head body. The handle can be latched in an upper, uncoupled, position and a lower, coupled, position by a spring-loaded trigger 76; itself pivoted to the handle and latching to upper and lower detents 78, 80 on the coupling head body. Both handle and trigger are formed of high density polyethylene.

Releasing the trigger and pivoting the handle downwards forces the tubular member 72 down out of the coupling head body so that the mouth 82 of the tubular member can engage the dispense poppet valve 52. The mouth 82 of the tubular member has an inturned lip 84 against which a dry break seal valve member 86, formed of Ethylene Propylene Diamene Monomer, is loaded by a stainless steel coil spring 88 housed within a relieved cylindrical recess 90 within the tubular member.

When the downwards stroke of handle 74 has been completed and the handle latched in the coupled position, the mouth 82 of the tubular member will have forced the popper valve 52 down the central pillar 34, exposing the ports 40 and engaging and sealing with the flared pillar side walls. Tubular member mouth 82 also seals against the poppet valve and the cap 36 on the dispense valve central pillar will have contacted the dry break seal valve member 86 and lifted it off its seat 84.

With the drum broached, i.e. the dispense valve assembly opened by the coupled and operated coupling head; an output fluid path (shown by large, shaded arrows in FIG. 1) is created from the bottom of the spear 14, up the spear into the central pillar 34, out of the pillar ports 40, into the tubular member mouth 82, through the dispense valve annular port 28, past the dry break valve 86 and into the upper portion of the tubular member 72. An output line to a pump (neither shown) can be attached to the threaded top 92 of the tubular member.

The necessary path for inflow of air (indicated by the slim, dark arrows in FIG. 1) is provided via the interface between the dispense valve flange 24 and the coupling head flange 66. The depth of the axial extension 68 is greater than the thickness of the dispense valve flange 24 so that, when the coupling head is coupled to the dispense valve assembly and the handle operated; the reaction between the coupling head tubular member 72 and the dispense valve spring 54 will lift the coupling head away from the dispense valve assembly until prevented by the coupling head lip 70. A gap will be created between the two flanges, permitting air to flow therebetween, down through the dispense valve annular port 28 about the tubular member 72, into the dispense valve 20 and out through axial ports 46 into the air space at the top of the drum 18.

Figure 3:
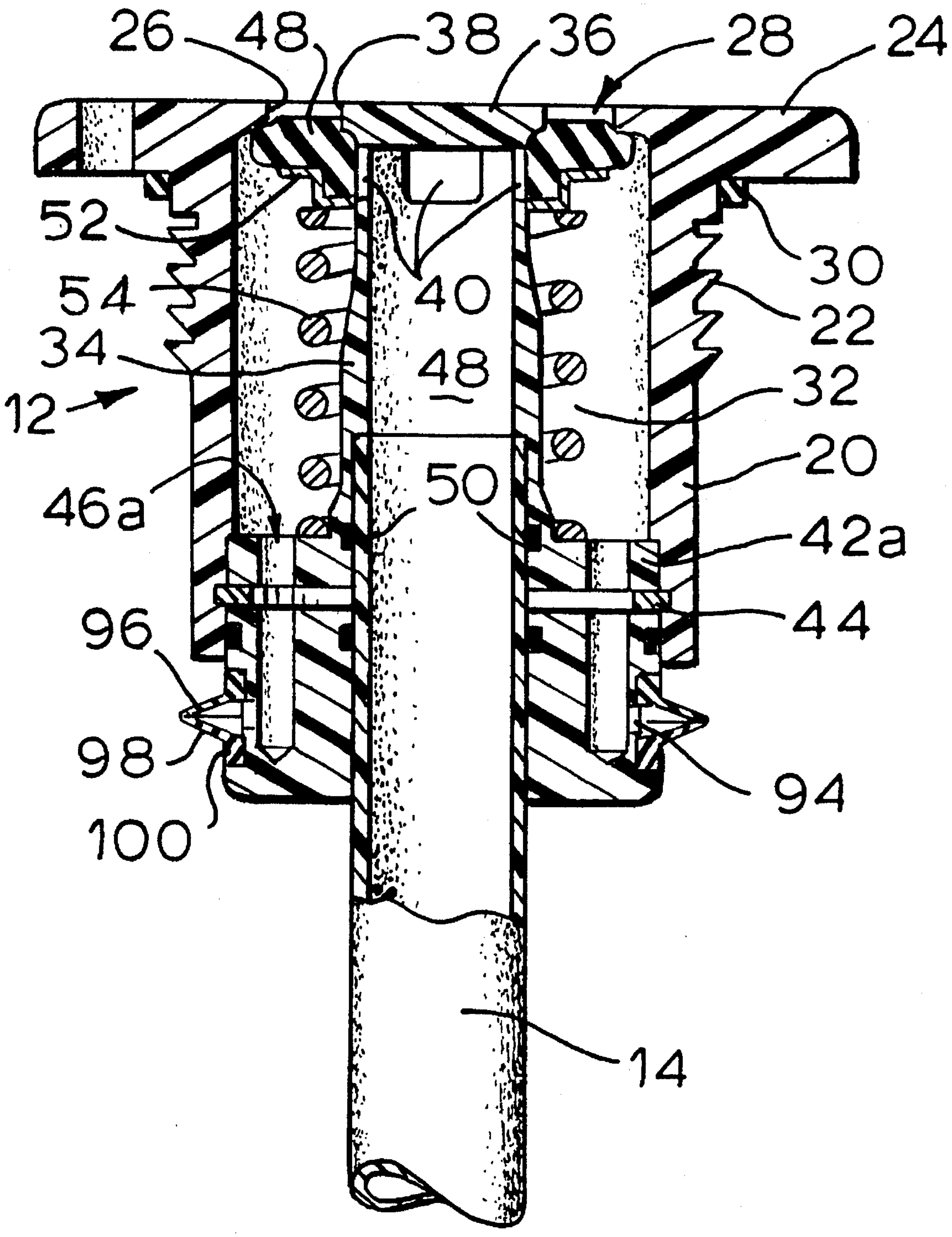
FIG.3 is a sectional view of a modified dispense valve assembly for the drum lance of FIG. 1.

FIG. 3 also shows a modified core flange **42*a*, having an increased axial depth, ports 46 are now blind bores 46*a* which communicate with radial bores 94 that lead to the outer surface of the flange. A pair of face-to-face, flexible diaphragms 96, 98 are located in-a peripheral groove 100 of the flange; into which groove the radial bores 94 emerge. The diaphragms form a non-return valve, permitting air to flow into the drum through bores 46*a*, 94 but preventing any fluid in the drum from flowing back into the valve body 20 and leaking outside the broached drum. This positioning of the non-return valves is important because the non-return valves prevent the valve body from filling with fluid when the drum is closed. The dispense valve 52** will prevent leakage but, without the non-return valves, the valve body could fill with fluid in transit and this fluid could leak once the drum had been broached.

The lower end of the spear may be provided with a sleeve 102, that is a simple sliding fit on the spear end. Notches 104 are provided in the bottom rim of the sleeve to enable fluid to flow into the spear. This axially adjustable sleeve enables the bottom of the drum to be contacted, the lance being fitted into the drum with the sleeve fully extended, contact with the drum bottom sliding the sleeve up the spear as the dispense valve assembly is screwed into the drum neck so that the sleeve remains in contact with the drum bottom. Advantageously, the drum has a sump 106 in the region of the spear sleeve, to assist collection and dispensing of all the drum contents.

I claim:

1. A method of dispensing fluid from a sealed container by negative pressure comprising the steps of:

mating a coupling head to a dispense valve assembly of a container, the dispense valve assembly sealing the container and having valves, for ingress of ambient air and egress of dispensed fluid respectively, and the coupling head being arranged to open the air and fluid valves and form a sealed connection solely with the fluid valve;

connecting the coupling head to a suction pump;

pumping fluid out of the container via the fluid valve and the coupling head, whilst ambient air flows into the container via the air valve; and, upon completion of dispensation of fluid, removing the coupling head from the dispense valve assembly;

whereupon the air and fluid valves will close, to reseal the container.

2. A method as claimed in claim 1 wherein the mating of said coupling head to said dispense valve assembly is such that an ambient airflow path is automatically formed from the atmosphere to said air valve, and said dispense valve assembly includes an airflow path from said air valve to the interior of said container such that, upon opening of said air valve by said coupling head, ambient air can flow freely into the container.

3. A fluid coupling for a negative pressure fluid dispense system comprising:

a dispense valve assembly for sealing a container and having valves for ingress of ambient air and for egress of dispensed fluid respectively; and, a coupling head to mate with the dispense valve assembly and having means operative to open the air and fluid valves and form a sealed connection solely with the fluid valve;

whereby fluid can be pumped out of the container via the fluid valve and the coupling head, whilst ambient air flows into the container via the air valve.

4. A fluid coupling as claimed in claim 3 wherein the dispense valve assembly is arranged to be fitted into the neck of a fluid container, the dispense valve assembly and said valves comprising a valve member springloaded to normally close an annular outlet port in the top of a dispense valve body, and the coupling head having a body to releasably engage the top of the dispense valve body and a ducted member axially slidable within the coupling head body for the bottom end of the axially slidable ducted member to engage and force down the dispense valve member, to define and seal a central fluid outlet from the container through said ducted member and form a concentric ambient air inlet for the dispense valve assembly into the container.

5. A fluid coupling as claimed in claim 4 wherein said ducted member has a spring loaded valve in its duct adjacent its bottom end for closing the duct when the bottom end is not engaging and forcing down said dispense valve member, and said dispense valve assembly includes a fixed member located in said annular outlet for bearing against and opening said spring loaded valve in said duct when said ducted member engages and forces down said dispense valve member.

6. A fluid coupling as claimed in claim 4, wherein the engagement between the coupling head body and the dispense valve body is arranged to provide an unsealed ambient airflow path between the coupling head and the dispense valve assembly controlled by said dispense valve member.

7. A fluid coupling as claimed in claim 6, wherein the dispense valve body has a top flange and the coupling head body is shaped to engage the dispense valve body flange, and the engagement between the coupling head body and the dispense valve body flange is arranged to provide an ambient airflow gap between the mated coupling head body and the dispense valve body flange forming part of said airflow path.

8. A fluid coupling as claimed in claim 7, wherein a one-way valve is fitted in the airflow path within the dispense valve assembly, to prevent fluid from leaking out of the container through the concentric air inlet when the coupling head is mated to the dispense valve assembly and the dispense valve member is positioned to open said concentric air inlet.

9. A fluid coupling as claimed in claim 8, wherein the dispense valve body includes an internal port or ports that, when the coupling head is mated to the dispense valve assembly, form the sole route for air to flow into the container from the concentric air inlet, non-return valves being fitted in the or each port.

10. A fluid coupling as claimed in claim 9, wherein the dispense valve assembly has a spear depending from the dispense valve body to the bottom of the container and the bottom end of the spear is provided with an axially slidable sleeve to contact the container bottom.

11. A fluid coupling as claimed in claim 3, wherein the engagement between the coupling head and the dispense valve assembly is arranged to provide an unsealed airflow path between the coupling head and the dispense valve assembly controlled by said air valve.

12. A fluid coupling as claimed in claim 11, wherein the dispense valve assembly has a top flange and the coupling head is shaped to engage the dispense valve assembly flange and the engagement between the coupling head and the dispense valve assembly flange is arranged to provide an airflow gap between the mated coupling head and the dispense valve assembly flange forming part of said air flow path.

13. A fluid coupling as claimed in claim 12, wherein a one-way valve is fitted in the air flow path within the dispense valve assembly, to prevent fluid from leaking out of the container through the air valve when the coupling head is mated to the dispense valve assembly.

14. A fluid coupling as claimed in claim 13, wherein the dispense valve assembly includes an internal port or ports that, when the coupling head is mated to the dispense valve assembly, form the sole route for air to flow into the container from the air valve, non-return valves being fitted in the or each port.

15. A fluid coupling as claimed in claim 1, wherein the dispense valve assembly has a spear depending from a dispense valve body to the bottom of the container and the bottom end of the spear is provided with an axially slidable sleeve to contact the container bottom.

16. A fluid coupling as claimed in claim 15, wherein the coupling head and the dispense valve assembly are mainly comprised of moulded plastics components.

17. A fluid coupling as claimed in claim 3 wherein said coupling head is devoid of pressurized gas connections, and wherein said coupling head and said dispense valve assembly are constructed and arranged such that, upon mating engagement thereof, an ambient airflow path is automatically formed from the atmosphere to said air valve and from said air valve to the interior of the container such that, upon opening of said air valve by said operative means, ambient air can flow freely into the container.

18. A fluid coupling as claimed in claim 17 wherein part of said ambient airflow path is formed between matingly engaging parts of said coupling head and said dispense valve assembly.

19. A fluid coupling as claimed in claim 18 wherein said matingly engaging parts are flanges on the coupling head and dispense valve assembly, respectively, and part of said ambient airflow path is defined by a clearance between said flanges.

20. A fluid coupling as claimed in claim 19 wherein said flanges are constructed and arranged to be movable toward and away from each other within set limits, and said dispense valve assembly includes spring means for automatically urging said flanges apart to increase said clearance when said operative means of said coupling head opens said air and fluid valves.

* * * * *